(12) United States Patent
Noguchi et al.

(10) Patent No.: US 7,175,290 B2
(45) Date of Patent: Feb. 13, 2007

(54) LAMINATED GLASS FOR VEHICLES AND METHOD FOR MANUFACTURING THE SAME

(75) Inventors: Tatsuya Noguchi, Tokyo (JP); Satoshi Furusawa, Tokyo (JP)

(73) Assignee: Nippon Sheet Glass Company, Limited, Tokyo (JP)

( * ) Notice: Subject to any disclaimer, the term of this patent is extended or adjusted under 35 U.S.C. 154(b) by 0 days.

(21) Appl. No.: 11/481,500

(22) Filed: Jul. 6, 2006

(65) Prior Publication Data

US 2006/0250711 A1 Nov. 9, 2006

Related U.S. Application Data

(62) Division of application No. 10/479,146, filed as application No. PCT/JP03/00143 on Jan. 10, 2003.

(30) Foreign Application Priority Data

Jan. 11, 2002 (JP) .............................. 2002-005379
Jan. 11, 2002 (JP) .............................. 2002-005380

(51) Int. Cl.
*G02B 27/00* (2006.01)
*B60J 1/02* (2006.01)

(52) U.S. Cl. .................... 359/601; 359/900; 296/96.19

(58) Field of Classification Search ................ 359/601, 359/602, 603, 609, 614, 883, 900; 296/84.1, 296/96.19
See application file for complete search history.

(56) References Cited

U.S. PATENT DOCUMENTS

| | | | |
|---|---|---|---|
| 2,593,525 A | 4/1952 | Beckham | |
| 3,597,050 A | 8/1971 | Plumat | |
| 4,244,997 A | 1/1981 | Postupack | |
| 4,725,710 A | 2/1988 | Ramus et al. | |
| 4,842,389 A | 6/1989 | Wood et al. | |
| 5,641,558 A | 6/1997 | Noda et al. | |
| 5,830,568 A | 11/1998 | Kondo | |
| 5,898,407 A | 4/1999 | Paulus et al. | |
| 5,902,505 A | 5/1999 | Finley | |
| 6,352,754 B1 * | 3/2002 | Frost et al. | ................... 428/77 |
| 2002/0192428 A1 | 12/2002 | Sol et al. | |

FOREIGN PATENT DOCUMENTS

AU 755 600 4/2000

(Continued)

*Primary Examiner*—Alessandro Amari
(74) *Attorney, Agent, or Firm*—Hamre, Schumann, Mueller & Larson, P.C.

(57) ABSTRACT

The present invention provides a laminated glass for vehicles exerting the functions that are difficult to be made compatible in combinations such as (1) a shade band in an interlayer and an optical device such as a CCD camera, (2) a heat shielding interlayer and an optical device, and (3) a heat shielding interlayer and a combiner. In this laminated glass for vehicles, the interlayer includes a first region and a second region that is either enclosed by the first region or formed by partially recessing an edge portion of the first region. The first region is provided with a light reducing function that imparts a light transmittance loss at least of visible light, and in the second region, the interlayer has a light transmittance loss of visible light that is smaller than that in the first region.

1 Claim, 11 Drawing Sheets

FOREIGN PATENT DOCUMENTS

| | | |
|---|---|---|
| EP | 0 999 104 | 5/2000 |
| GB | 2 271 139 | 4/1994 |
| JP | 3-125025 | 12/1991 |
| JP | 8-259279 | 10/1996 |
| JP | 9-188133 | 7/1997 |

\* cited by examiner

LAMINATED GLASS FOR VEHICLES AND METHOD FOR MANUFACTURING THE SAME

This application is a divisional application of application Ser. No. 10/479,146 filed Nov. 25, 2003 as a National Stage of PCT/JP03/00143 filed Jan. 10, 2003.

TECHNICAL FIELD

The present invention relates to a laminated glass for vehicles, more specifically to a laminated glass that includes a functional interlayer (intermediate film).

BACKGROUND ART

To improve a glare reducing property and a heat shielding property, a laminated glass for vehicles such as a windshield sometimes has a band-shaped shade region (a shade band) that is colored green, blue or the like. Although a shade-band may be provided on a surface of a glass sheet, it generally is formed by partially coloring an interlayer for joining glass sheets along a strip. There is a region in windshields where by law a visible light transmittance should be a predetermined value (e.g. 70%) or more. In this description, this field hereinafter is often referred to as "a visual field region". Thus, a shade-band should be formed out of the visual field region, and generally is arranged in an upper area of the windshield.

To absorb heat radiation and ultraviolet rays, colored glass sheets frequently are used for a laminated glass for vehicles, especially for automobiles. Typical colored glass sheets include a green glass sheet that contains more iron-based ingredients than usual. Nowadays, it is proposed that an interlayer also has an infrared ray absorbing function. For example, this function can be added to the interlayer by dispersing electrically conductive minute particles of ITO (indium tin oxide) or the like into the film made of a thermoplastic resin such as polyvinylbutyral (PVB), as disclosed in JP8-259179 A. This infrared ray absorbing function derived from an interlayer mostly is imparted to the whole area of the windshield that includes the visual field region.

In recent years, the need for installing various devices in vehicles has arisen so as to achieve an ITS (intelligent transport system) communication or the like. Examples of the devices include a photoreceiver such as a CCD (charge coupled device) camera or a rain sensor for detecting the light that has a wavelength in a visible and infrared range and that passes through a window glass, especially a windshield. When the photoreceiver is installed on the interior surface of a windshield, it is desirable that the photoreceiver is arranged in an upper region of the windshield so as to secure safety and exert the function of the photoreceiver sufficiently.

However, as explained above, a shade-band frequently is formed in the upper region. The shade band considerably lowers the light transmittance of the windshield in a visible and infrared range, and thus deteriorates the sensitivity of the photoreceiver that receives the light through the windshield. Therefore, conventionally, the position of the photoreceiver is forced to change or the use of the photoreceiver with the shade band should be abandoned. Similarly, when the windshield includes an interlayer that has a heat shielding property, the sensitivity of the photoreceiver cannot help decreasing, especially when the photoreceiver detects infrared rays.

Some vehicles have a HUD (head-up display) for displaying information that is necessary for driving such as a vehicle speed on a windshield. A HUD requires a light source installed inside the vehicle and a reflectance increasing film (combiner) for reflecting the light from the source toward the eyes of the operator. In general, the combiner is formed on an inside surface of the windshield within its visual field region.

However, in the windshield that includes a heat-shielding interlayer, the film as well as a combiner lowers the visible light transmittance of the windshield. Thus, the transmittance in the region where the combiner is formed is sometimes below the legal limit. When the windshield includes a colored glass sheet that is excellent in a heat shielding property, the replacement of the colored glass sheet by a normal clear glass sheet increases the visible light transmittance of the windshield. However, this replacement for increasing the visible light transmittance in a partial region decreases the heat shielding property over the whole region.

As explained above, (1) a shade band and a photoreceiver, (2) a heat shielding interlayer and a photoreceiver, and (3) a heat shielding interlayer and a combiner are difficult to be made compatible with each other in a practical use since the shade band and the heat shielding film decrease the light transmittance.

Conventionally, when the need for partially changing the optical property of the windshield arises, a thin film is partially formed on the glass sheet. This is convenient to specify the region where the property should be changed for a HUD combiner or the like since the glass sheet is cut into a predetermined shape prior to a lamination step. A ceramic print that should be formed in a frame shape in a windshield is printed on the surface of the glass sheet.

On the other hand, when the need for imparting some function to a relatively wide region or the whole region of a windshield arises, the function is frequently added into an interlayer of the windshield. This is because the addition of functional materials into an interlayer that is made of organic materials is often advantageous in reducing a manufacturing cost, and an interlayer is used for forming a shade band or adding electrically conductive minute particles, for example. In most cases, interlayers are supplied to a lamination step in a rolled-up state, and thus it is considered inappropriate to treat them partially in regions that correspond with predetermined regions of windshields.

Thus, under these circumstances, to achieve the combinations of (1) to (3), an anti-reflecting film should be formed on a predetermined region of a windshield where a photoreceiver should be arranged so as to increase the light transmittance of the region. However, when relying on such a conventional approach, the sensitivity of the photoreceiver cannot be restored sufficiently or the reflectance of the combiner needs to be lowered for the legal limitation on the visible light transmittance.

DISCLOSURE OF INVENTION

In view of the above circumstances, the present invention provides a laminated glass for vehicles in which at least two glass sheets are adhered to one another with an interlayer interposed between the two glass sheets. The interlayer includes a first region and a second region that is either enclosed by the first region or formed by partially recessing an edge portion of the first region. The first region has a light reducing function that imparts a light transmittance loss at least of visible light, and in the second region, the interlayer has a light transmittance loss for visible light that is smaller than that of visible light in the first region.

EMBODIMENTS OF THE INVENTION

According to the present invention, a windshield may be provided with a first region where a visible light transmittance loss is relatively high and a second region where a visible light transmittance loss is relatively low. For example, the first region exercises some function with a light transmittance loss such as glare reduction or heat shielding, whereas the second region may be used as an optical window (an optical opening). These two regions are provided with an interlayer. A laminated glass with an interlayer providing a specific region where some property should be adjusted has been considered inappropriate for mass production. However, such a laminated glass also can be manufactured in a large scale by only using a step of combining two interlayers that are mass-manufactured individually, as exemplified later. Providing the regions with the interlayer is advantageous since an undesirable light transmittance loss that is caused by the functional material added in the interlayer can be reduced considerably or in some cases perfectly.

The light transmittance loss in the second region preferably is not more than 3%, more preferably not more than 2%, further more preferably not more than 1%. A general-purpose PVB film, which is free from a functional material for absorbing infrared rays or coloring, has a light transmittance loss of substantially 0%, and thus such "a normal PVB film" is sufficient for the second region. However, the second region may include a functional material as long as the material does not considerably decrease the light transmittance.

The first region can be formed by adding various kinds of functional materials into a thermoplastic resin such as PVB. For example, a heat shielding interlayer can be manufactured by mixing an infrared ray absorbing material such as electrically conductive minute particles into an interlayer, and a shade band can be manufactured by using a coloring agent such as a pigment or a dye. There are no particular limitations with respect to the functional material, and conventional functional materials may be used. Typical examples of the electrically conductive minute particle include an ITO minute particle. As for the pigment for the shade band, organic pigments such as an azo-based pigment, a phthalocyanine-based pigment, and a quinacridone-based pigment as well as inorganic pigments such as metal oxides and metal powders may be used.

When using a pigment, a colored layer and clear layers should be prepared by extrusion molding from a resin composition that is obtained by mixing the pigment with resin and plasticizer and a resin composition that is free from pigments and composed of resin and plasticizer individually, and the colored layer should be sandwiched by the clear layers to obtain a colored interlayer. When using a dye, as described later, the dye should be applied only to a predetermined region of an interlayer that is formed beforehand.

The first region as well as the second region should let at least a part of the visible light pass through, or the first region should provide a light transmittance loss such that the visible light transmittance is not reduced to 0%. When the first region overlaps with the visual field region that requires at least a prescribed value of a visible light transmittance and this visual field region also should have a heat shielding property derived from the interlayer, it is preferable that the amount of the functional material added into the first region is limited such that visible light transmittance in the first region is the prescribed value (for example, 70%) or more.

The laminated glass for vehicles of the present invention further may include a non-transparent print region that is formed in frame shape on a peripheral portion of the laminated glass and encloses the first region and the second region. This non-transparent region may be called a ceramic print region.

The laminated glass for vehicles of the present invention further may include a photoreceiver that is arranged such that it receives the light that passes through the second region. The photoreceiver may be installed on an interior surface of a windshield and preferably arranged such that it covers the opening region. Such an arrangement can prevent the direct light of a driving obstacle from passing through the opening, even if the opening partially eliminates the glare reducing property of the shade band. There are no limitations with respect to the photoreceiver, and an optical sensor such as a CCD camera or a rain sensor can be used, for example.

The laminated glass for vehicles of the present invention further may include a reflectance increasing film that is formed in the second region. This reflectance increasing film can be used as a HUD combiner. In a preferred embodiment of the present invention, a visible light transmittance of a prescribed value, for example 70%, or more can be achieved even in the region where a combiner is formed.

In one embodiment of the present invention, a part of a heat shielding interlayer is replaced with a normal interlayer such as a normal PVB film that is inferior in heat shielding to form an optical opening. In this embodiment, the entire region except an optical opening as a second region may be a region where the interlayer provides a heat shielding property, namely a first region.

In another embodiment of the present invention, a part of an interlayer with a band-shaped shade region (a shade band) is replaced with a normal interlayer to form an optical opening. In this embodiment, the optical opening as a second region may be arranged inside the shade region as a first region or arranged at the end of the shade region to be in contact with the residual of the shade region There are no limitations with respect to the glass sheets for a laminated glass of the present invention, and soda-lime glass for general-purpose use can be used. As a glass sheet made of soda-lime glass, a clear glass sheet and colored glass sheets can be used. Examples of the colored glass sheets include a green glass sheet that contains a relatively high amount of iron ingredients to improve a heat shielding property and a total amount of iron ingredients in a green glass sheet may be 0.2 wt % or more, preferably 0.5 wt % or more, in terms of $Fe_2O_3$.

There are no limitations with respect to the interlayer for a laminated glass of the present invention, and a PVB film, which is made of general-purpose thermoplastic resin in this technical field, is sufficient.

In this description, the light transmittance loss caused by an interlayer in a laminated glass is in principle calculated based on a glass sheet that has the same thickness as the total thickness of one or more glass sheets of the same type included in the laminated glass. For example, with respect to the laminated glass that consists of the two green glass sheets at a thickness of 2 mm and an interlayer, the light transmittance loss caused by the interlayer can be calculated by subtracting the visible light transmittance of the laminated glass from that of the green glass sheet with a thickness of 4 mm. As for the laminated glass that consists of a clear glass sheet at a thickness of 2 mm, a green glass sheet at a thickness of 2 mm and an interlayer, the light transmittance loss caused by the interlayer can be calculated by subtracting the visible light transmittance of the laminated glass from that of a laminated glass that consists of these two glass sheets and a normal PVB interlayer for bonding them. This PVB interlayer should be confirmed that it provides no substantial light transmittance loss.

The light transmittance losses of interlayers were measured. The interlayers were manufactured by adding various functional materials into PVB films such that the films were appropriate for a practical use. A clear glass sheet and a green glass sheet were used as the glass sheets. The results are shown in Table 1.

TABLE 1

|  | Visible Light Transmittance | Transmittance loss |
|---|---|---|
| Clear (4 mm) single sheet (Standard 1) | 88.9% | — |
| Clear (2 mm)/PVB/Clear (2 mm) | 88.9% | 0.0% |
| Clear (2 mm)/HSF/Clear (2 mm) | 83.2% | 5.7% |
| Green (4 mm) single sheet (Standard 2) | 79.4% | — |
| Green (2 mm)/PVB/Green (2 mm) | 79.4% | 0.0% |
| Green (2 mm)/HSF/Green (2 mm) | 74.5% | 4.9% |
| Green (2 mm)/PGF/Green (2 mm) | 29.9% | 49.5% |
| Green (2 mm)/DYF/Green (2 mm) | 6.3% | 73.1% |

PVB: a PVB film that is free from a functional material
HSF: a heat shielding PVB film in which ITO minute particles are dispersed
PGF: a PVB film that includes a light-green pigment
DYF: a PVB film that includes a dark-blue dye Here, the clear glass sheet includes about 0.1 wt % of iron ingredients in terms of $Fe_2O_3$, and the green glass sheet includes about 0.5 wt % of iron ingredients in terms of $Fe_2O_3$.

Hereinafter, the embodiments of the present invention will be described with reference to the accompanying drawings.

Figure 1:
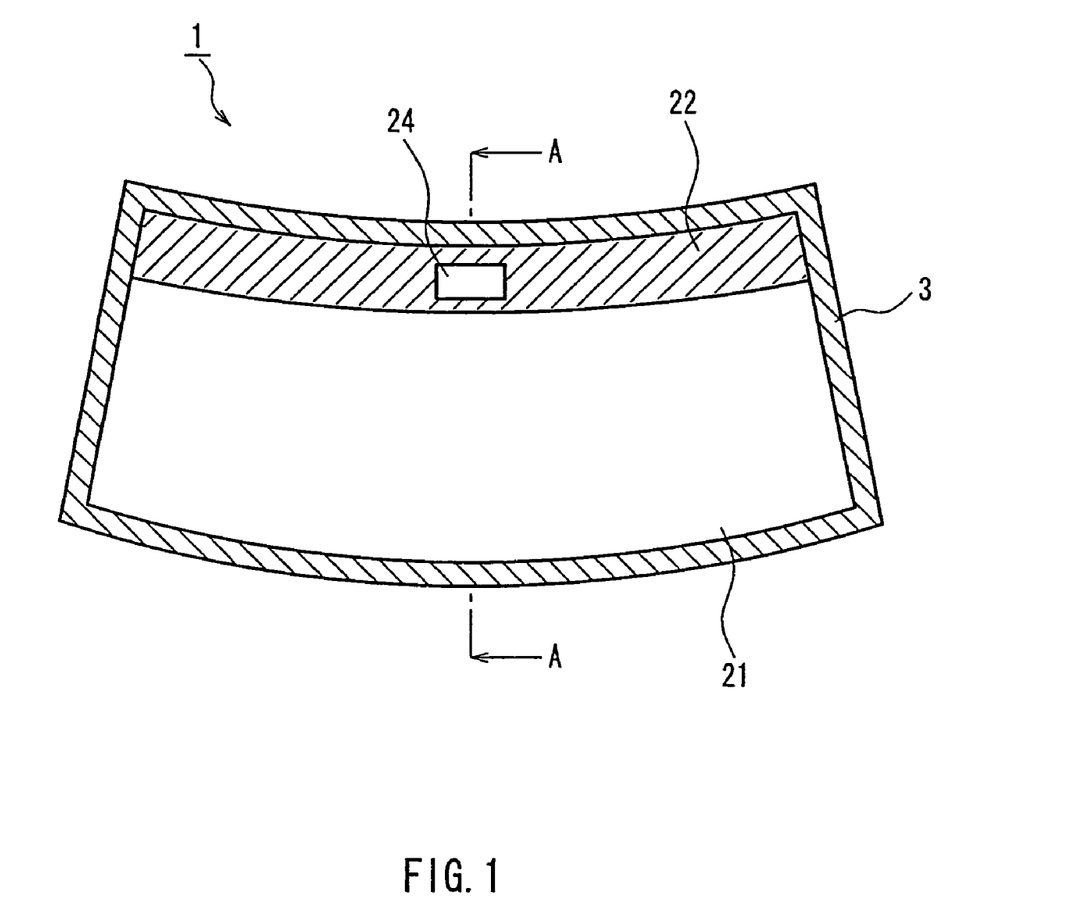
FIG. 1 is a plan view that shows an embodiment of a laminated glass for vehicles in accordance with the present invention in which an interlayer with a shade band is used.
Figure 2:
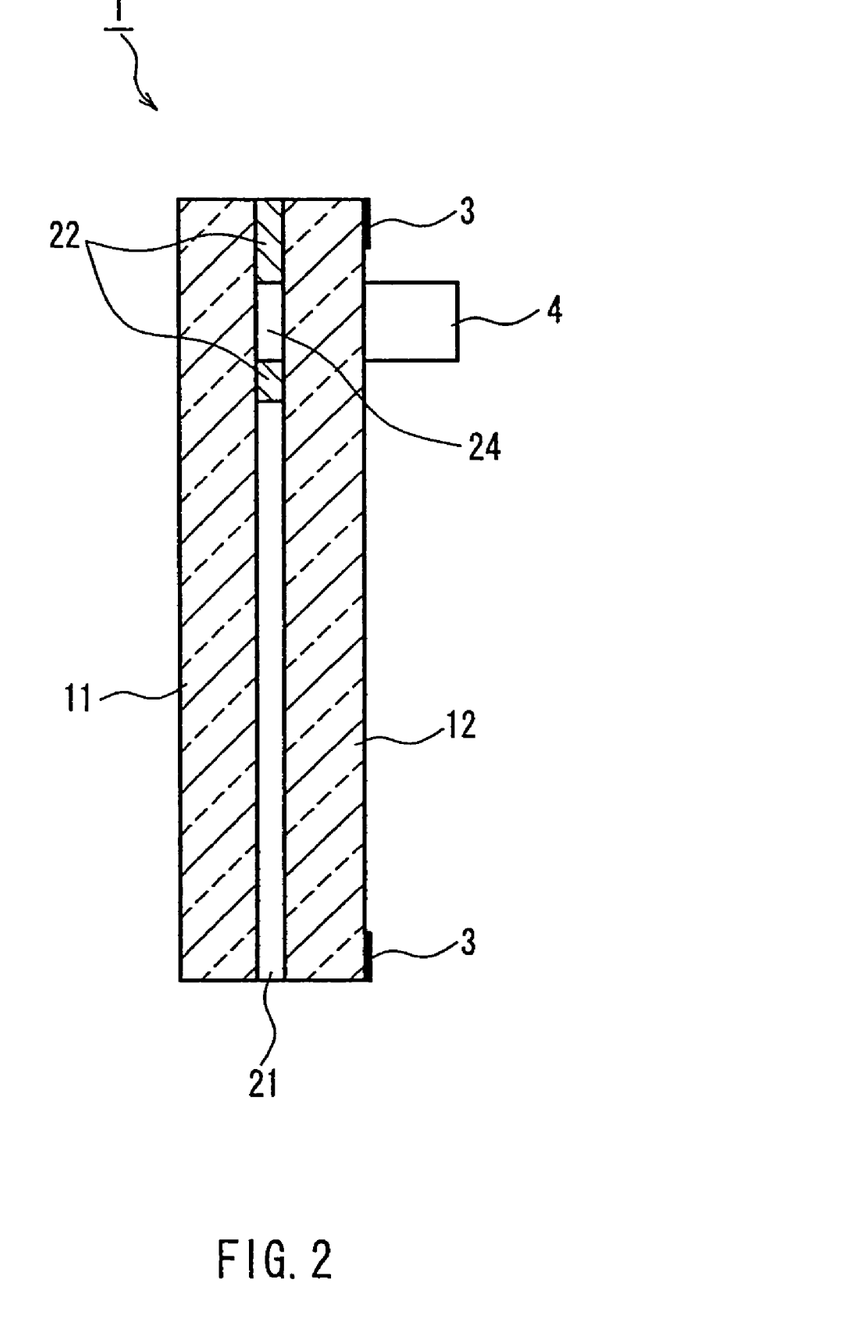
FIG. 2 is a sectional view taken on line A—A of FIG. 1.

The laminated glass 1 in FIGS. 1 and 2 has a ceramic print 3 that is formed on the peripheral portion of the interior surface of the laminated glass. The ceramic print 3 provides a non-transparent frame with the laminated glass and determines a transparent region by the frame. Although the ceramic print 3 is formed on an interior surface of the inside glass sheet 12 in this embodiment, the other surfaces also may have a ceramic print, preferably with the same pattern.

The interlayer 21 that bonds the pair of the glass sheets 12 and 13 together has a shade band 22 in a strip along its upper end. A coloring agent such as a pigment is added into the shade band 22 such that glare reducing or some other effects are produced while keeping a visible light transmittance for viewing the outside. To comply with the legal limitation on the visible light transmittance, the shade band 22 is arranged in the upper area of the windshield, avoiding the visual region. A gradation may be provided at the boundary between the shade band 22 and the remaining region.

An opening region 24 is provided around a center of the shade band 22, and a photoreceiver (an optical sensor) 4 is arranged on the interior surface of the windshield 1 such that it can detect the light through this region 24 that has a relatively high transmittance. The opening region 24 is free from the coloring agent as well as the remaining region where no shade band is formed.

Figure 3:
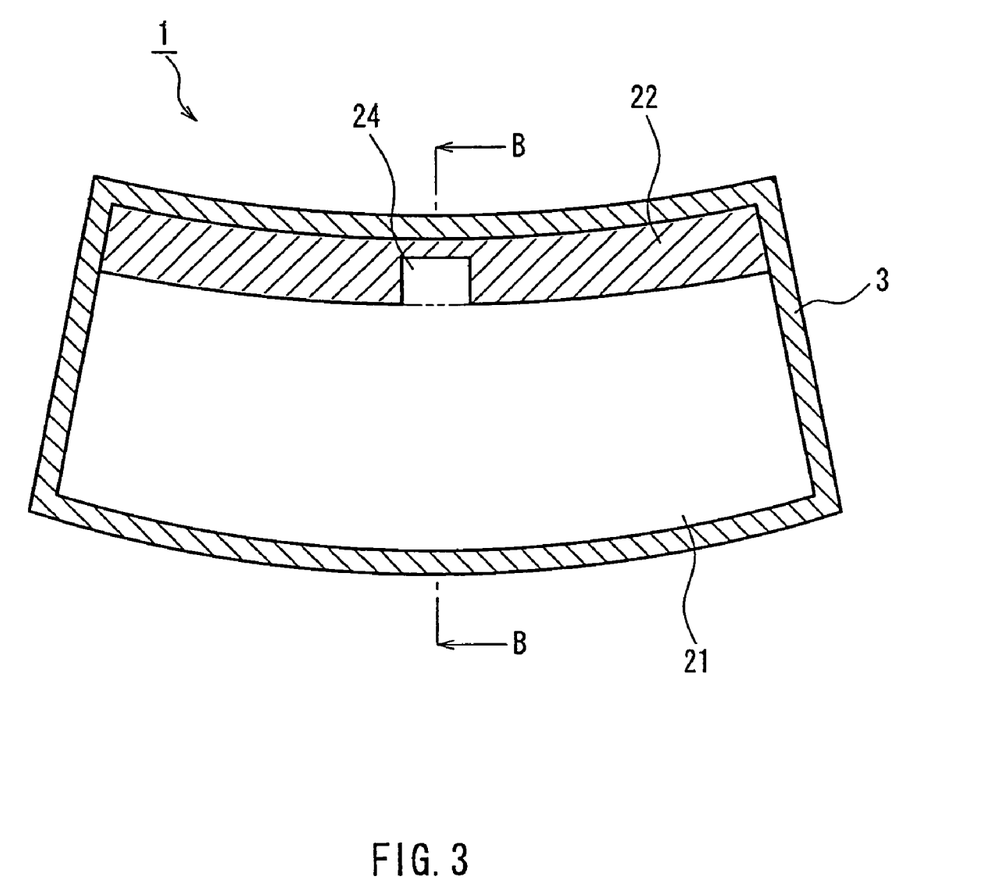
FIG. 3 is a plan view that shows another embodiment of a laminated glass for vehicles in accordance with the present invention in which an interlayer with a shade-band is used.
Figure 4:
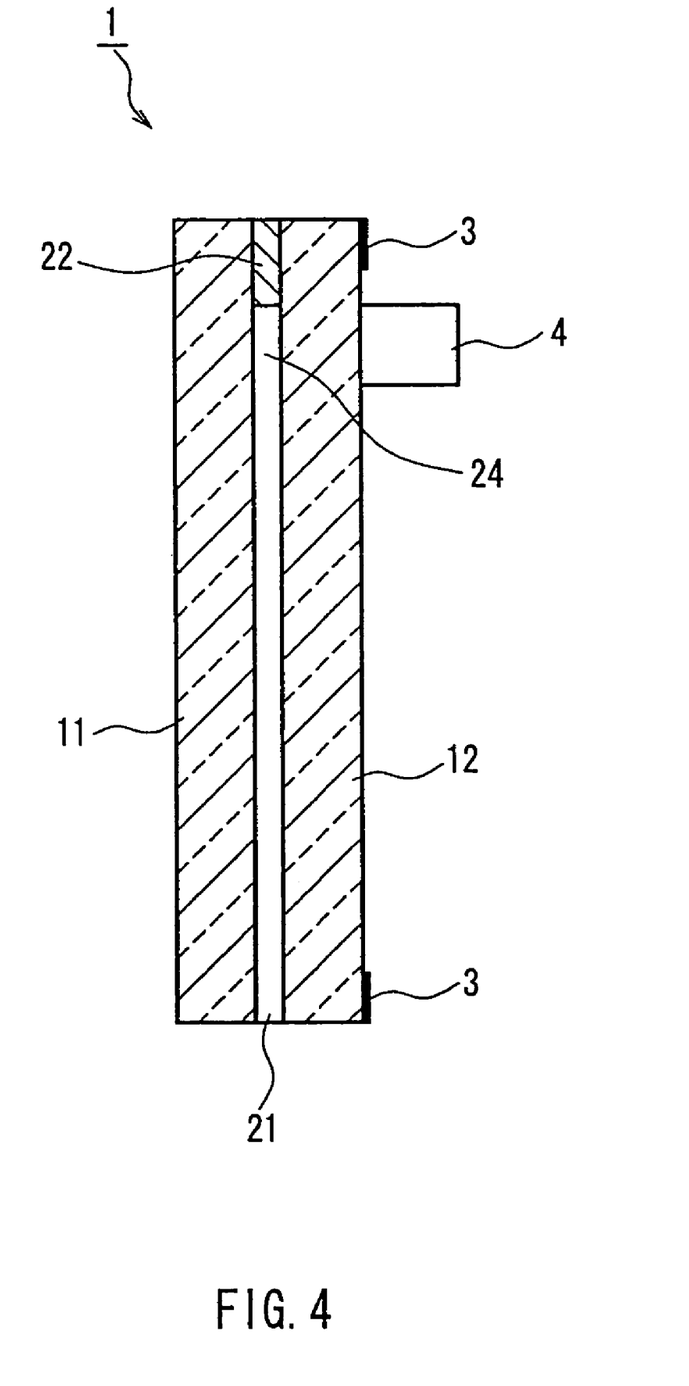
FIG. 4 is a sectional view taken on line B—B of FIG. 3.

The opening region 24 may be arranged to be in connection with the lower remaining region, as shown in FIGS. 3 and 4. In other words, this opening region 24 is a recess region formed by partially recessing the lower edge of the band-shaped shade band 22.

Figure 5:
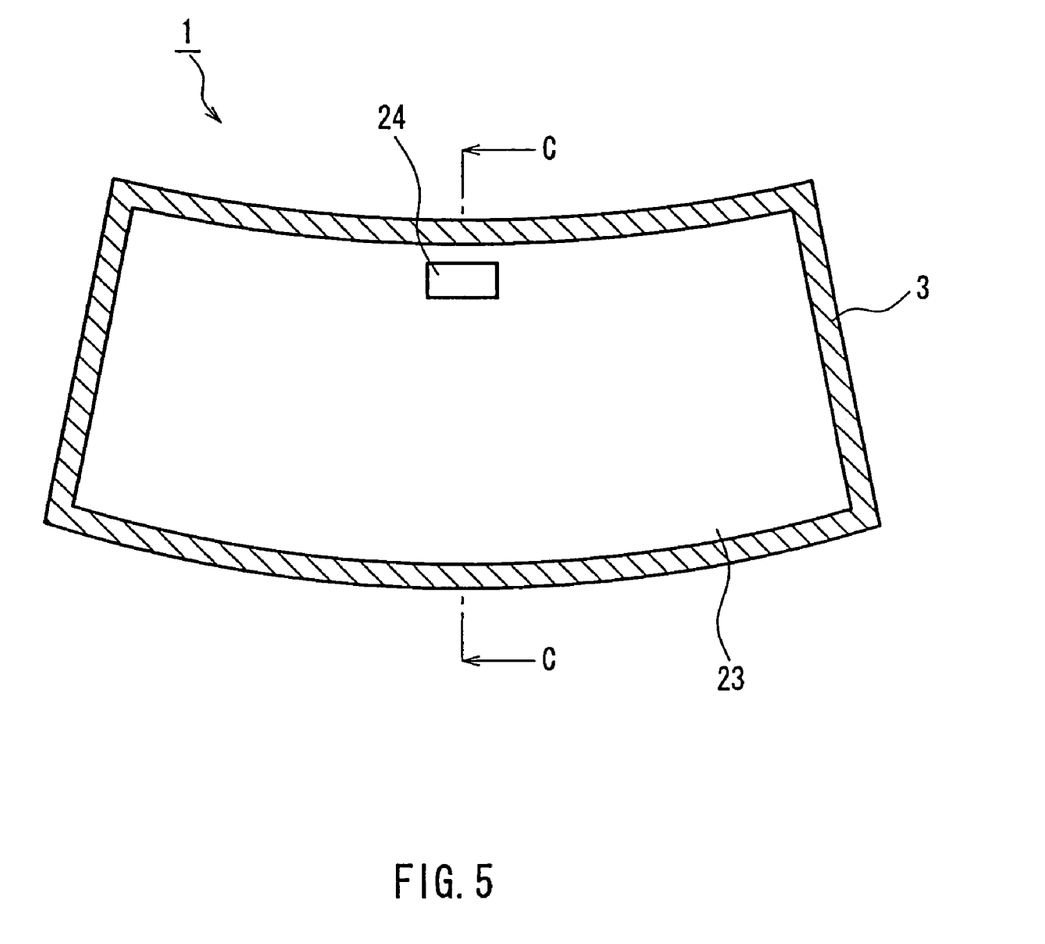
FIG. 5 is a plan view that shows still another embodiment of a laminated glass for vehicles in accordance with the present invention in which a heat shielding interlayer is used.
Figure 6:
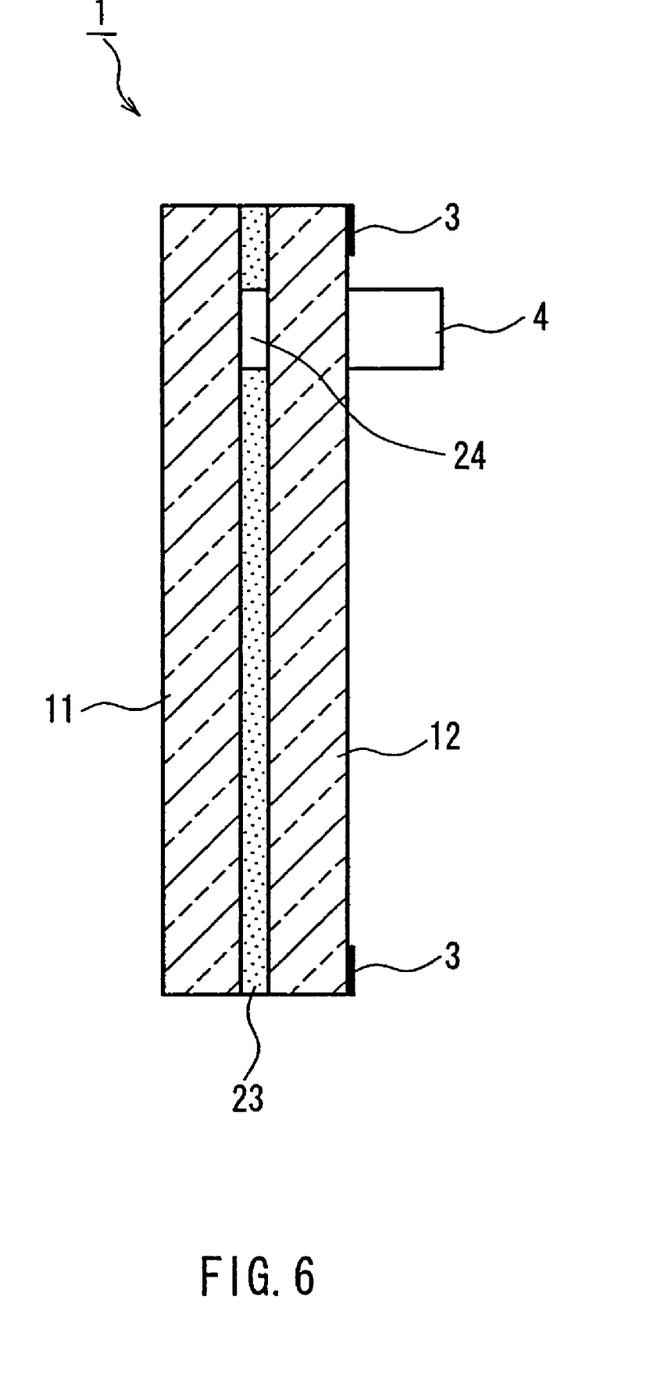
FIG. 6 is a sectional view taken on line C—C of FIG. 5.

The opening region 24 may be formed in an interlayer 23 in which electrically conductive minute particles are dispersed, as shown in FIGS. 5 and 6. The electrically conductive minute particles provide an infrared absorption function for the entire region except the opening region 24 of the windshield 1. An optical sensor 4 may be provided on the interior surface also in this embodiment such that the sensor can detect the light through the opening region 24.

Figure 7:
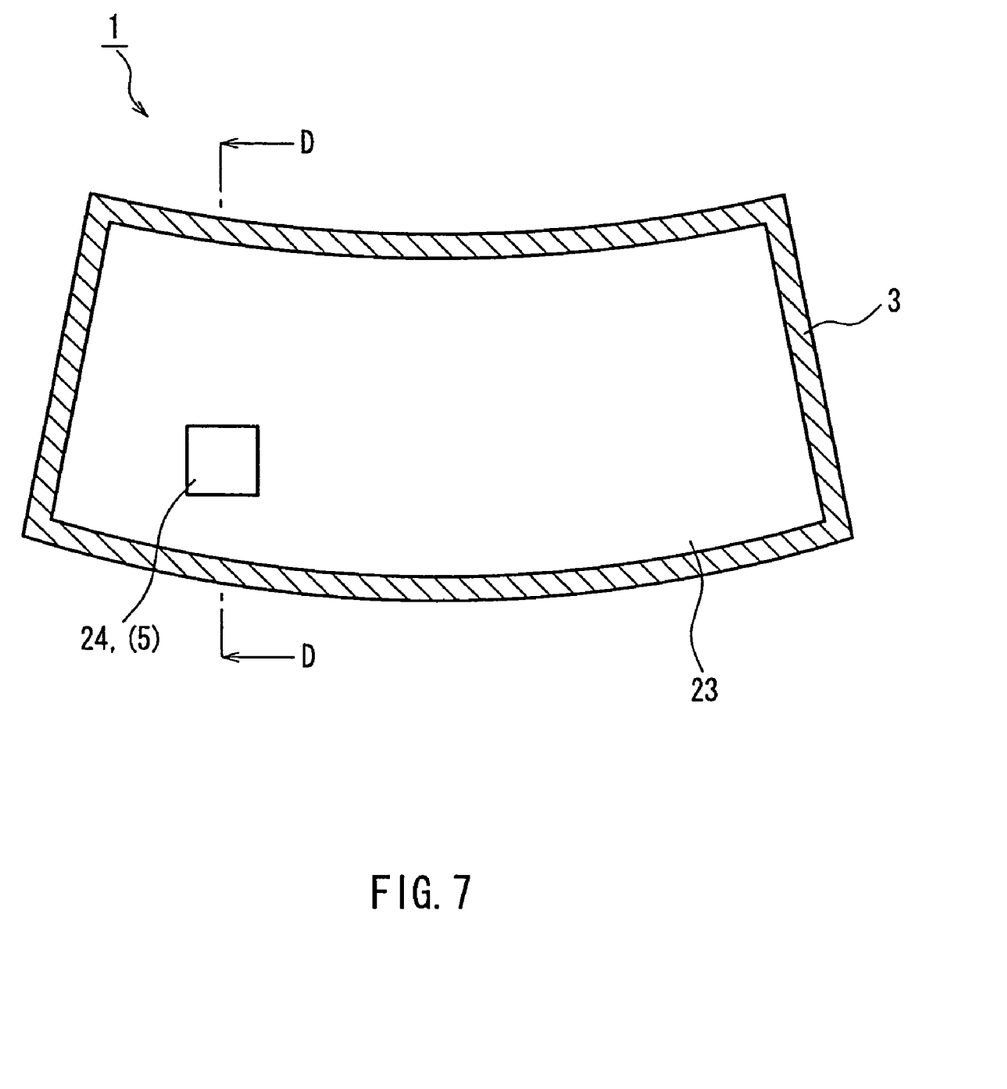
FIG. 7 is a plan view that shows yet another embodiment of a laminated glass for vehicles in accordance with the present invention in which a heat shielding interlayer is used.
Figure 8:
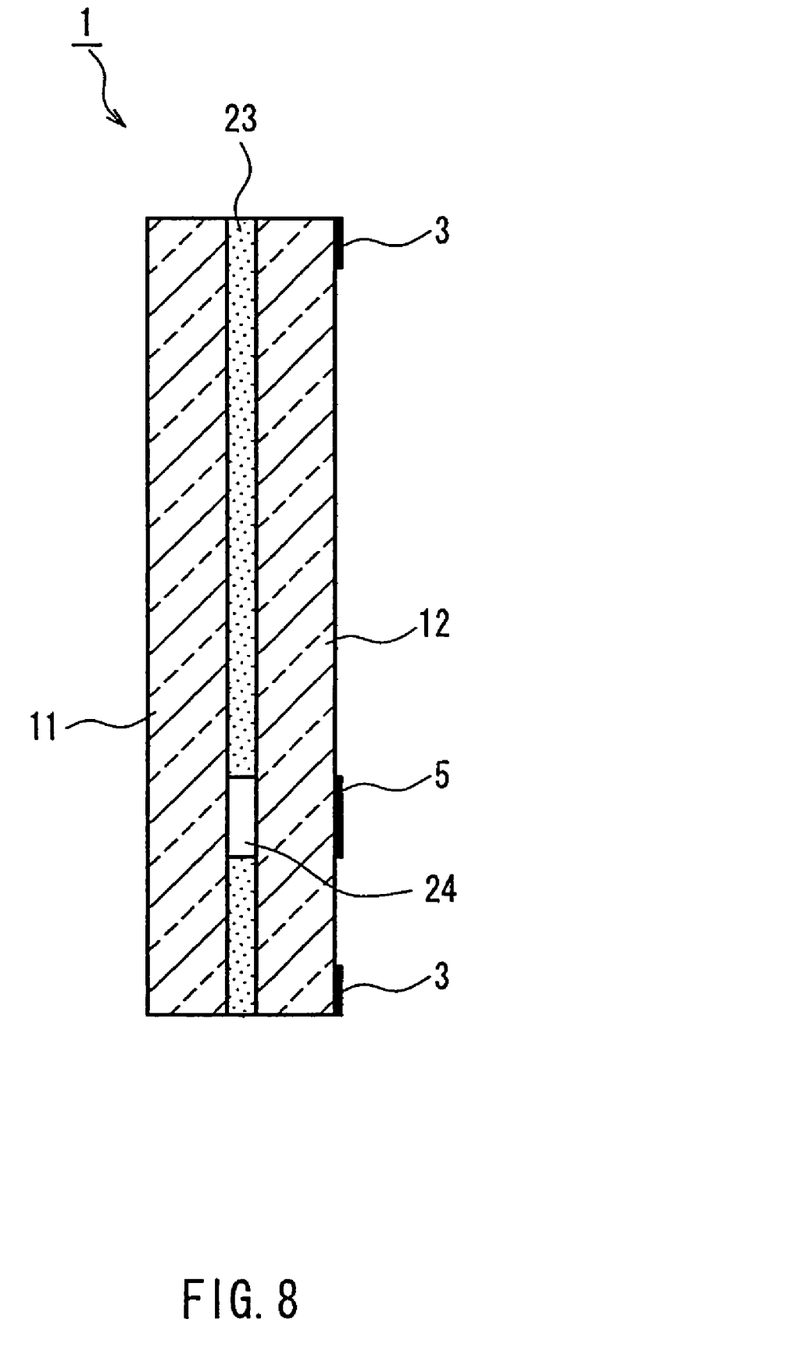
FIG. 8 is a sectional view taken on line D—D of FIG. 7.

In another embodiment shown in FIGS. 7 and 8, a HUD combiner 5 that is designed to increase the reflectance is formed on the interior surface of the windshield 1. The HUD combiner 5 should be arranged in the visual field region of the windshield so as to display its function. The visible light transmittance would considerably decrease due to the reflectance increase effect of the combiner 5, if it is affected by the electrically conductive minute particles in the heat shielding interlayer 23. However, the combiner 5 is formed in the opening region 24 that is free from the electrically conductive minute particles so as not to overlap with the heat shielding interlayer 23, which eases the partial drop of the visible light transmittance in the combiner region.

The surface for forming the combiner 5 is not limited to the interior surface of the inside glass sheet, and the other surfaces of the glass sheet may be used for the combiner.

Hereinafter, one example of manufacturing a method for an interlayer to be included in the windshield in accordance with the present invention will be described with reference to FIGS. 9A to 9D.

Figure 9A:
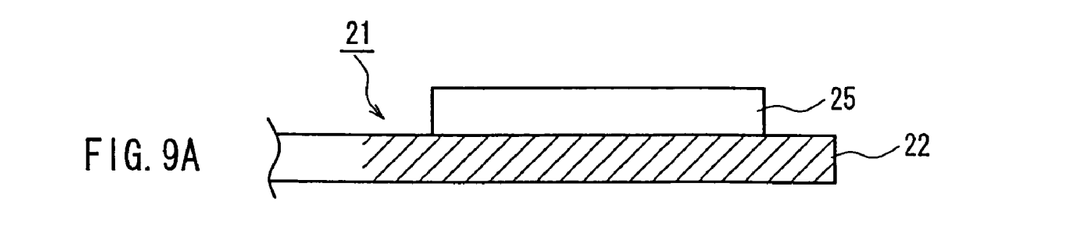
FIGS. 9A to 9D each illustrate a step in a manufacturing process for an interlayer that is used in a laminated glass for vehicles in accordance with the present invention.

(1) First, a normal interlayer 25 that is free from a coloring agent etc, is laid on an interlayer 21 that has a shade band 22 along its one end (FIG. 9A). The normal interlayer 25 should be arranged so as to overlap at least a portion of the shade band 22.

Figure 9B:
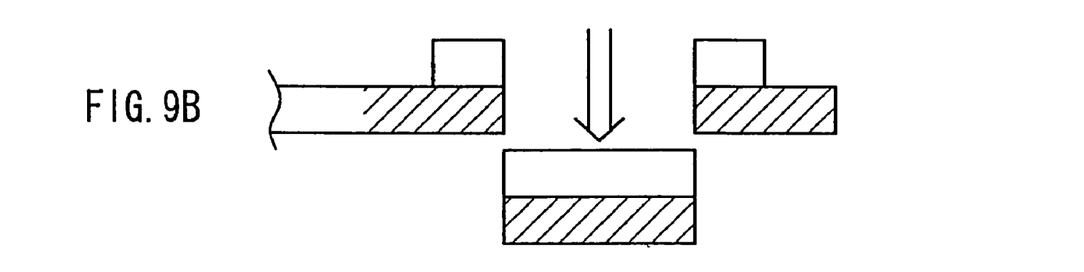

(2) The interlayers 21 and 25 are stamped out together with a die that has a predetermined stamping shape (FIG. 9B).

Figure 9C:
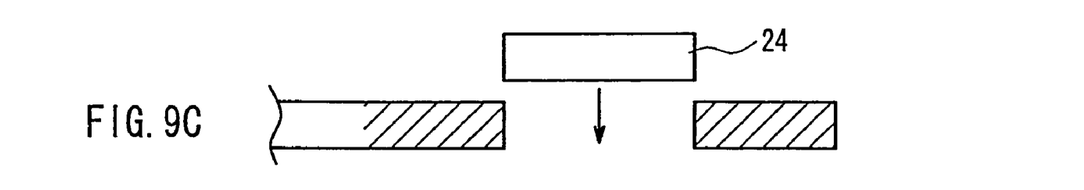
Figure 9D:
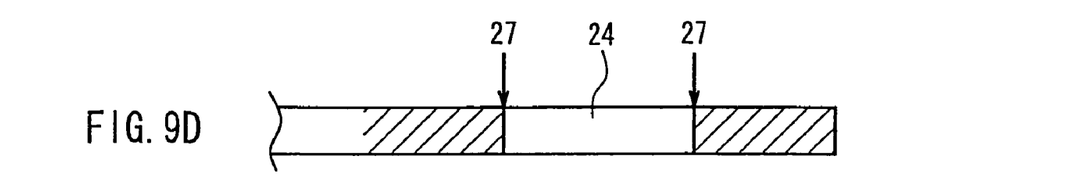
Figure 10A:
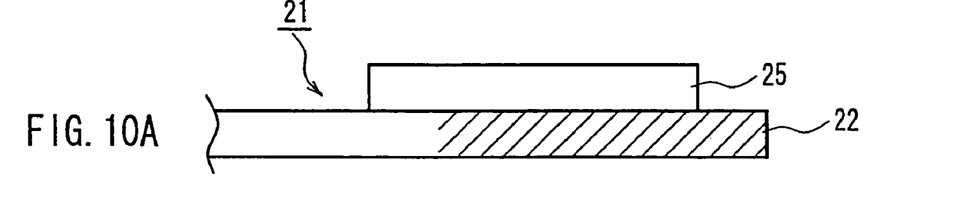
FIGS. 10A to 10D each illustrate a step in another manufacturing process for an interlayer that is used in a laminated glass for vehicles in accordance with the present invention.
Figure 10B:
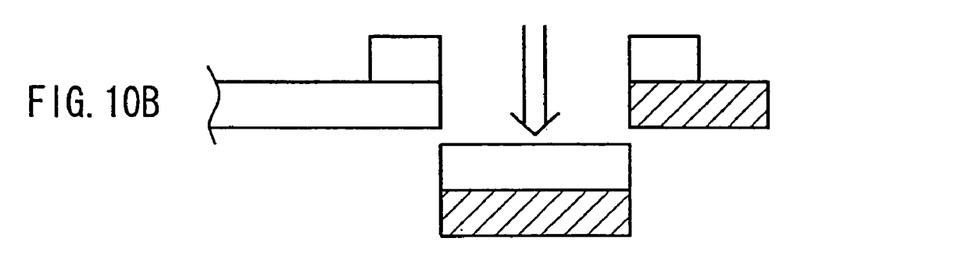
Figure 10C:
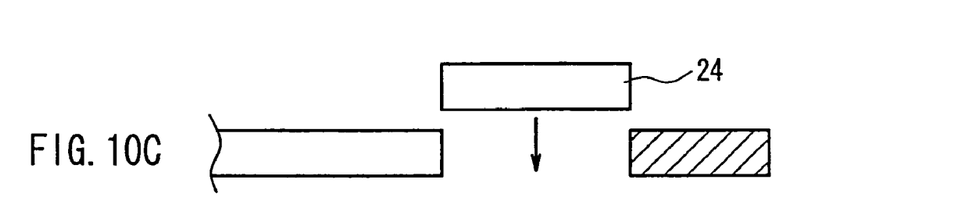
Figure 10D:
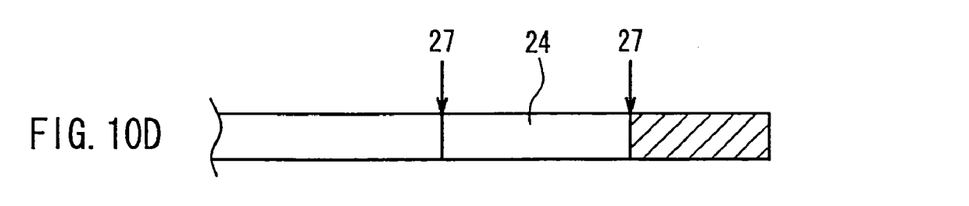

(3) The stamped normal interlayer is taken out from the stamped-out films, and then this cut-out interlayer 24 is inserted into an opening of the shade band 22 in the remaining interlayer 21 (FIGS. 9C and 9D).

The boundary 27 around the opening of the interlayer may be pre-joined with a soldering iron, for example at 100° C. to 200° C., so that a gap or a step in the interlayer can be eliminated with reliability. The interlayer can be plasticized by heating in a preliminary bonding step and in an autoclave step that are included in a manufacturing step for a laminated glass. However, the advance removal of gaps or steps is helpful for preventing the defects such as distortion at the boundary 27.

To form an opening region 24 in FIG. 3, the interlayers 21 and 25 should be stamped out in a range that contacts or includes an edge of the shade band 22 as shown in FIGS. 10A to 10D.

An interlayer as obtained by the above method and glass sheets that are cut into a predetermined shape, and if necessary further bent, are used for manufacturing a laminated glass, which can be obtained by a conventional laminating method.

As described above, the present invention can provide a method for manufacturing a laminated glass for vehicles. This method includes: laminating a first interlayer and a second interlayer together, wherein the first interlayer includes a first region that is provided with a light reducing function that imparts a light transmittance loss at least of visible light and the second interlayer has a light transmittance loss that is smaller than that of the first region; removing, in a predetermined region that includes a part of the first region, a part of the first and second interlayers; inserting the part of the second interlayer obtained from the predetermined region into the predetermined region in the first interlayer, thereby producing an interlayer that includes the first region and a second region that is surrounded by the first region or formed by partially recessing an edge of the first region and has a light transmittance loss of visible light that is smaller than a light transmittance loss of visible light in the first region; and bonding at least two glass sheets together with this interlayer.

According to this method, the first and second interlayers can be mass-manufactured individually, and transported and stored in a rolled-up state separately, and as the need arises, the composite interlayer can be obtained by the above manufacturing method.

Figure 11:
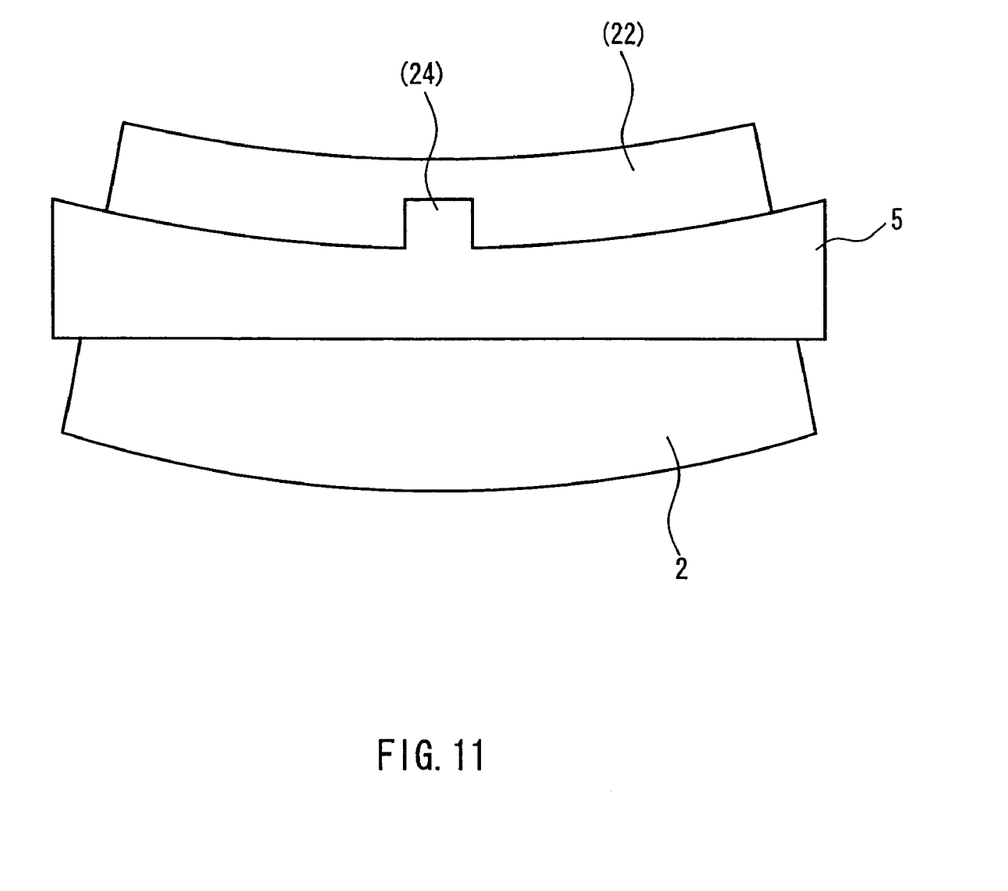
FIG. 11 illustrates an example of a mask shape for manufacturing an interlayer that is used in a laminated glass for vehicles in accordance with the present invention.

A method for manufacturing the interlayer is not limited to the above method, and the interlayer with a shade band that is formed with a coloring agent such as a dye can be obtained by another method below. In this method, a dye is applied with a mask 5 only onto a region to be a shade band in an interlayer 2, as shown in FIG. 11. The dye can be applied by spraying or printing. The mask may have a protrusion 24 for an optical opening that provides a relatively small transmittance loss.

The present invention can provide another method for manufacturing a laminated glass for vehicles. This method includes: supplying a coloring agent to a part of an interlayer with a mask so as to provide the interlayer with a first region and a second region that is surrounded by the first region or formed by partially recessing an edge of the first region, wherein the first region is provided with a light reducing function that imparts a light transmittance loss at least of visible light, and the second region has a light transmittance loss that is smaller than a light transmittance loss of visible light in the first region; and bonding at least two glass sheets with this interlayer.

EXAMPLES

Example 1

One example for manufacturing a windshield as shown in FIGS. 1 and 2 will be described below.

(1) A PVB interlayer for a laminated glass was prepared with a resin composition that included 100 weight parts of PVB and 40 weight parts of a plasticizer, followed by partially coloring the interlayer in a strip along its one edge to form a shade band. This interlayer was cut into a somewhat larger size with respect to the windshield to be manufactured.

(2) An opening region was formed by replacing a predetermined region in the shade band of the interlayer with a normal PVB film that was free from a coloring agent such as a dye or the like to provide an opening region that had a substantially rectangular outside shape, as shown in FIGS. 9A to 9D. The boundary of the opening region was pretreated with a soldering iron so as to remove a step.

(3) A windshield laminated glass for automobiles was obtained by inserting the interlayer between two green glass sheets at a thickness of 2 mm, preliminary bonding and bonding in an autoclave. The glass sheets were cut into a predetermined size and then bent beforehand.

In this laminated glass, the visible light transmittance in the opening region of the shade band was 79%. This was about the same as that of the laminated glass obtained by using a normal PVB film. The visible light transmittance and the solar radiation transmittance in the shade band were 30% and 28.5%. When a CCD camera or a rain sensor was installed such that they detected the light that passed through the opening region, these optical sensors worked without any trouble.

Example 2

A windshield laminated glass was obtained by the same method as in Example 1 except that the steps as shown in FIGS. 10A to 10D were substituted for those as shown in FIGS. 9A to 9D (see FIGS. 3 and 4). The optical sensors on this laminated glass also worked without any trouble.

In Examples 1 and 2, the optical sensors were arranged such that they covered the opening region, and thus the glare reducing effect of the shade bands was not affected.

Example 3

A windshield laminated glass was obtained by the same method as in Example 1 except that a heat shielding interlayer was substituted for the interlayer with a shade band (see FIGS. 5 and 6). The heat shielding interlayer was obtained from a resin composition that included 100 weight parts of PVB, 33 weight parts of a plasticizer and 7 weight parts of ITO minute particle dispersed solution (ITO solid content: 10%). The optical sensors on this laminated glass also worked without any trouble.

The visible light transmittance in the opening region was the same as that in Example 1, and the visible light transmittance and the solar radiation transmittance in the region except the opening region, namely in the heat shielding region, were 74.5% and 40%.

In Example 3, the optical sensors were arranged such that they covered the opening region of the heat shielding interlayer, and thus the heat shielding effect in the opening region was not affected.

Example 4

A HUD combiner was formed by a process below, instead of installing the light sensors.

(1) A heat shielding interlayer was manufactured as in Example 3 and then it was cut into a predetermined size that was somewhat larger than that of a windshield to be manufactured.

(2) A predetermined region of the heat shielding film was substituted for a normal PVB film that was free from a coloring agent such as a dye to form an opening region that had a substantially rectangular outward form. This opening region was arranged in an area where a HUD combiner should be formed. The boundary of this opening region was pre-treated with a soldering iron so as to remove a step.

(3) Two green glass sheets were prepared that were cut and bent into a predetermined shape (thickness: 2 mm). A solution containing $SiO_2$—$TiO_2$ was applied by roll-coating onto an interior surface of one of the glass sheets to be arranged on the inside of the automobile, followed by drying and baking it to form a HUD combiner with a refractive index n of about 1.92 and a physical thickness d of about 110 nm. The interlayer was positioned between the green glass sheets, and then they were preliminarily bonded and finally bonded in an autoclave to obtain a windshield laminated glass for automobiles.

The visible light transmittance was 71.5% in the combiner region (the opening region of the interlayer) of the laminated glass. The visible light reflectance of the incident light at an angle of 60° was 19%, which proved that it worked sufficiently as a combiner. The area except for the combiner region provided an excellent heat shielding property as in Example 3.

For comparison with the laminated glass, another laminated glass was prepared as in Example 3 except that no opening region was formed. The visible light transmittance in the combiner region of the laminated glass was 66.5%, namely less than 70%.

The invention claimed is:

1. A method for manufacturing a laminated glass for vehicles that comprises at least two glass sheets and an interlayer for bonding the two glass sheets to one another, the method comprising:

laminating a first interlayer and a second interlayer together, wherein the first interlayer comprises a first region that is provided with a light reducing function that imparts a light transmittance loss at least of visible light, and the second interlayer has a light transmittance loss that is smaller than that in the first region;

removing, in a predetermined region that includes a part of the first region, a part of the first and second interlayers;

inserting the part of the second interlayer obtained from the predetermined region into the predetermined region in the first interlayer, thereby producing an interlayer that includes the first region and a second region that is surrounded by the first region or formed by partially recessing an edge of the first region and has a light transmittance loss of visible light that is smaller than that in the first region; and bonding at least two glass sheets together with said interlayer.

* * * * *